United States Patent
Li

(10) Patent No.: US 10,073,332 B1
(45) Date of Patent: Sep. 11, 2018

(54) PROJECTION DISPLAY EQUIPMENT

(71) Applicant: SHENZHEN 1 DREAMLAND E-COMMERCE CO., LTD., Shenzhen (CN)

(72) Inventor: Ling Li, Shenzhen (CN)

( * ) Notice: Subject to any disclaimer, the term of this patent is extended or adjusted under 35 U.S.C. 154(b) by 0 days.

(21) Appl. No.: 15/885,817

(22) Filed: Feb. 1, 2018

(30) Foreign Application Priority Data

Oct. 24, 2017 (CN) .......................... 2017 1 1004079

(51) Int. Cl.
| | | |
|---|---|---|
| G03B 21/16 | (2006.01) | |
| G03B 21/14 | (2006.01) | |
| H04N 9/31 | (2006.01) | |
| G03B 21/20 | (2006.01) | |
| H04R 1/02 | (2006.01) | |
| G02F 1/1362 | (2006.01) | |
| G02F 1/1335 | (2006.01) | |

(52) U.S. Cl.
CPC ... *G03B 21/2033* (2013.01); *G02F 1/133526* (2013.01); *G02F 1/136286* (2013.01); *G03B 21/145* (2013.01); *G03B 21/16* (2013.01); *G03B 21/2066* (2013.01); *H04N 9/3141* (2013.01); *H04N 9/3144* (2013.01); *H04R 1/025* (2013.01)

(58) Field of Classification Search
CPC ...... G03B 21/16; G03B 21/145; G03B 21/14; G03B 21/20; G03B 21/2006; G03B 21/2013; G03B 21/202; G03B 21/2026; G03B 21/2033; G03B 21/204; G03B 21/206; G03B 21/2086; G03B 21/2093; H04N 9/3141; H04N 9/3144

USPC .......................... 353/52, 57, 58, 60, 61, 119
See application file for complete search history.

(56) References Cited

U.S. PATENT DOCUMENTS

| | | | | |
|---|---|---|---|---|
| 2007/0126994 | A1* | 6/2007 | Hwang | G02B 6/0046 353/94 |
| 2007/0291238 | A1* | 12/2007 | Yanagisawa | G03B 21/16 353/119 |
| 2009/0290131 | A1* | 11/2009 | Kim | G03B 21/16 353/61 |
| 2010/0171889 | A1* | 7/2010 | Pantel | G02F 1/133308 349/1 |
| 2013/0010268 | A1* | 1/2013 | Nishima | G03B 21/16 353/52 |
| 2015/0338725 | A1* | 11/2015 | Kase | G03B 21/2013 353/58 |

* cited by examiner

*Primary Examiner* — Ryan Howard
(74) *Attorney, Agent, or Firm* — Prakash Nama; Global IP Services, PLLC

(57) ABSTRACT

The patent discloses projection display equipment which comprises a shell and a detachable shell cover, wherein a light source device, an optical conversion device, a driver board provided with a video input interface, a power circuit board provided with a power interface, and a loudspeaker are arranged in the shell, a front air outlet and a rear air outlet are formed in the side faces of the shell, and supporting feet are arranged at the lower end of the shell; the light source device is connected with the driver board and the power circuit board through wires; the driver board and the power circuit board are connected through a wire; the loudspeaker is connected with the power circuit board through a wire; the light source device is connected with a radiator; a ventilating fan is arranged beside a light source lamp circuit board, the power circuit board and the loudspeaker.

10 Claims, 3 Drawing Sheets

PROJECTION DISPLAY EQUIPMENT

BACKGROUND OF THE INVENTION

The utility model relates to display equipment, in particular to projection display equipment.

At present, a driver board, a light source, a light machine and other components of a projector are generally arranged in a shell, heat generated by the light source severely affects the driver board, and consequentially, heat dissipation of a light source lamp panel is seriously limited; when a negative temperature coefficient (NTC) thermistor on the driver board reaches a certain temperature, the excessively-high temperature shutdown protection function of the projector can be triggered, however, the operating environment temperature of the projector is limited to a certain extent, and normal use by users is affected. Furthermore, the driver board and a fan are isolated by other components, a heat dissipation airflow channel is blocked, consequentially, the heat dissipation effect of the fan on the light source lamp panel is poor, and effective airflow cannot be formed easily.

BRIEF SUMMARY OF THE INVENTION

The utility model aims to provide projection display equipment, by arranging a metallic aluminum radiator and a ventilating fan beside a light source lamp, a driver board and a power circuit board, an excellent heat dissipation effect is achieved, and meanwhile, the heat dissipation stability and the heat dissipation safety are improved.

For realizing the above aim, the following technical scheme is adopted by the utility model:

Projection display equipment comprises a shell and a detachable shell cover, wherein a light source device, an optical conversion device, a driver board provided with a video input interface, a power circuit board provided with a power interface, and a loudspeaker are arranged in the shell, a front air outlet and a rear air outlet are formed in the side faces of the shell, and supporting feet are arranged at the lower end of the shell; the light source device is connected with the driver board and the power circuit board through wires; the driver board and the power circuit board are connected through a wire; the loudspeaker is connected with the power circuit board through a wire; the light source device is connected with a radiator; a ventilating fan is arranged beside a light source lamp circuit board, the power circuit board and the loudspeaker.

As an optimization scheme, the light source device is provided with a reflection hopper, and a light source lamp fixedly connected with the radiator is arranged in the reflection hopper.

As an optimization scheme, the optical conversion device is provided with a Fresnel lens, a liquid crystal display screen, a collecting lens, a reflector, and a projection lamp which are sequentially arranged on the emergent light path of the light source device, and a first projection lens and a second projection lens are arranged in the projection lamp; the liquid crystal display screen is connected with the driver board and the power circuit board through wires; the projection lamp is movably connected with the shell.

As an optimization scheme, on-off keys and a multi-functional key are arranged on the top surface of the detachable shell cover.

As an optimization scheme, the on-off keys and the multi-functional key are correspondingly connected with buttons on the driver board through actuating tappets.

As an optimization scheme, the light source lamp is an LED lamp.

As an optimization scheme, the collecting lens can be rotatably adjusted.

As an optimization scheme, a lamp cover is arranged on the projection lamp.

As an optimization scheme, a dustproof sponge is arranged at the air outlets.

As an optimization scheme, the radiator is made of metallic aluminum.

As an optimization scheme, the height of the supporting feet can be adjusted.

The projection display equipment of the utility model has beneficial effects such as adopting a light source heat dissipation system composed of the metallic aluminum radiator and the ventilating fan, so that when a projector operates, the heat generated by the light source lamp and power circuit board is effectively discharged, and damage to electronic elements in the projector caused by excessively-high temperature is avoided; meanwhile, the aluminum radiator with an excellent heat dissipation effect is adopted, no noise is generated when the radiator operates, the requirement of the projector for the operating environment temperature is more relaxed, and cost increase is avoided.

DETAILED DESCRIPTION OF THE INVENTION

A further description of the utility model is given with accompanying drawings as follows, what needs to be pointed out is that the embodiment provides a detailed execution mode and a specific operation process based on the technical scheme, however, the protection scope of the utility model is not limited to the embodiment.

Figure 1:
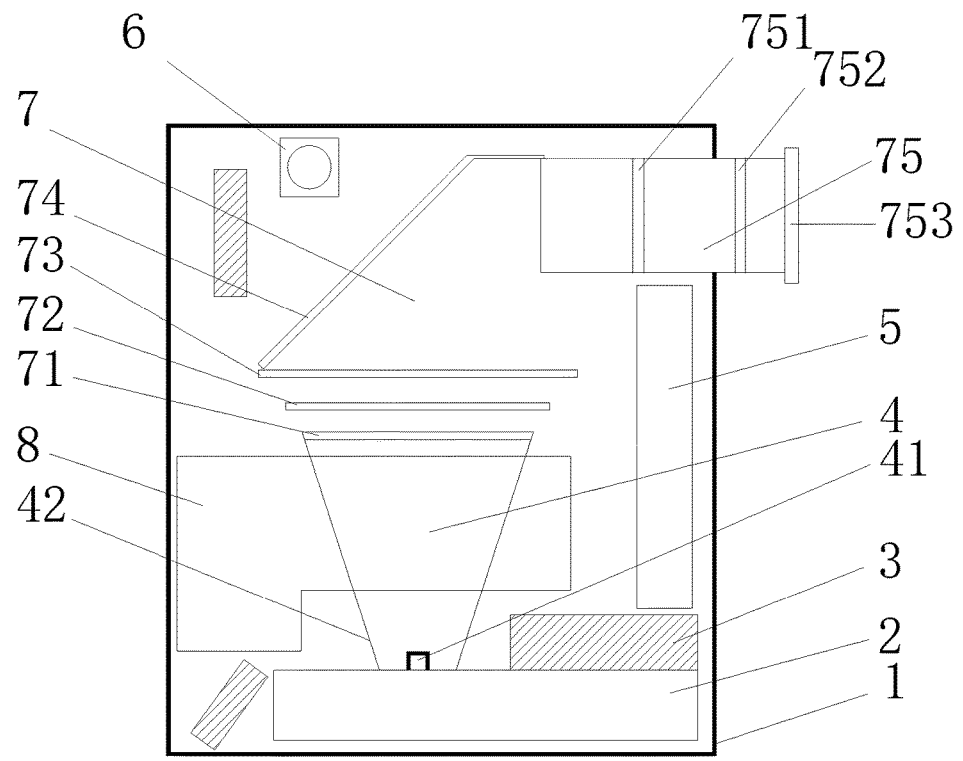
FIG. 1 is a schematic diagram of the internal structure of the utility model.
Figure 2:
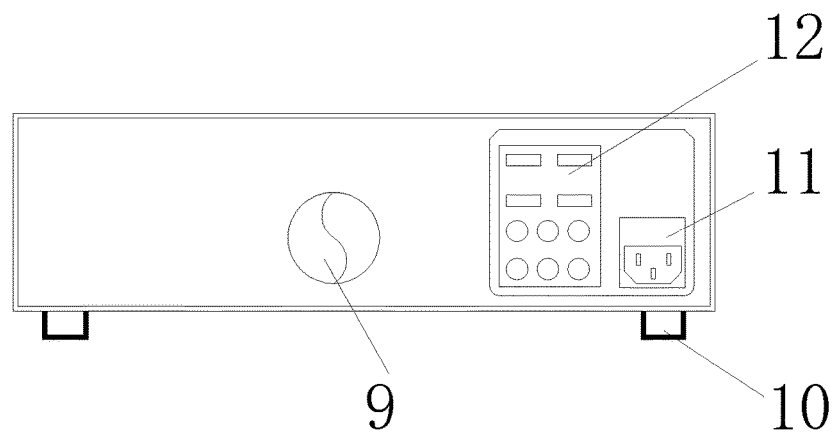
FIG. 2 is a left view of the utility model.
Figure 3:
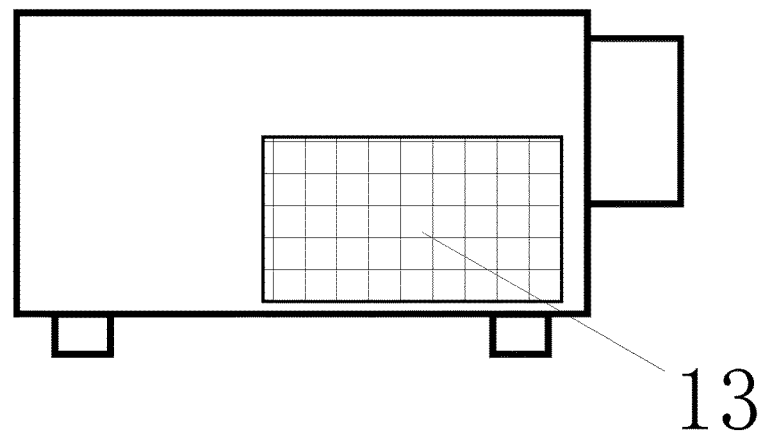
FIG. 3 is a front view of the utility model.
Figure 4:
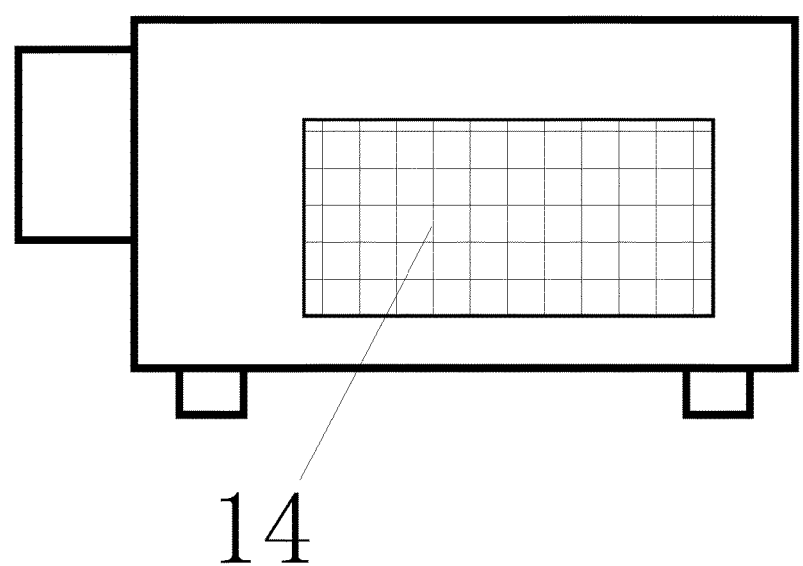
FIG. 4 is a rear view of the utility model.
Figure 5:
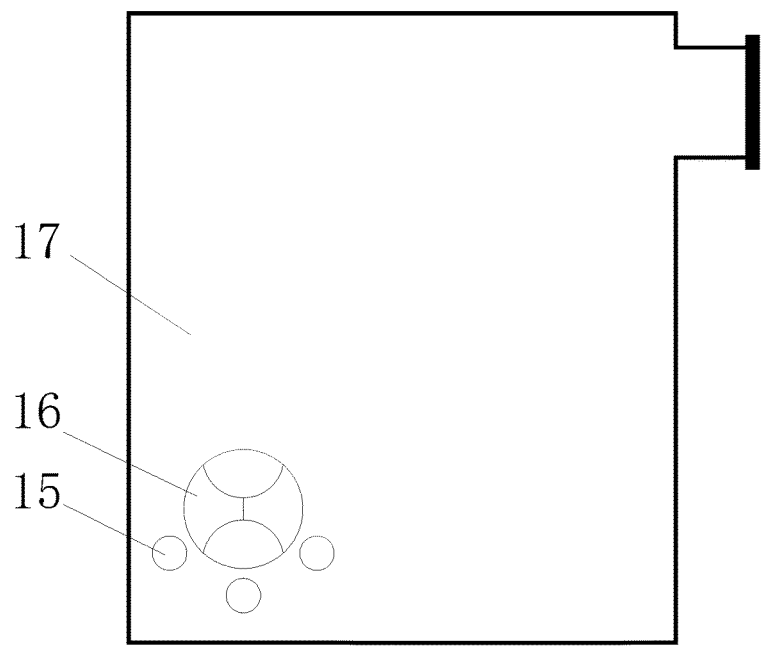
FIG. 5 is a top view of the utility model;
Marks in the Drawings: 1, shell; 2, radiator; 3, ventilating fan; 4, light source device; 5, power circuit board; 6, loudspeaker; 7, optical conversion device; 8, driver board; 9, collecting lens control knob; 10, supporting foot; 11, power interface; 12, video input interface; 13, front air outlet; 14, rear air outlet; 15, on-off key; 16, multi-functional key; 17, detachable shell cover; 41, light source lamp; 42, reflection hopper; 71, Fresnel lens; 72, liquid crystal display screen; 73, collecting lens; 74, reflector; 75, projection lamp; 751, first projection lens; 752, second projection lens; 753, lamp cover.

As is shown in FIGS. 1-5, projection display equipment comprises a shell 1 and a detachable shell cover 17, wherein a light source device 4, an optical conversion device 7, a radiator 2, a driver board 8 provided with a video input interface 12, a power circuit board 5 provided with a power interface 11, and a loudspeaker 6 are arranged in the shell 1, a front air outlet 13 and a rear air outlet 14 are formed in the side faces of the shell 1, and supporting feet 10 are arranged at the lower end of the shell 1; the light source device 4 is connected with the driver board 8 and the power circuit board 5 through wires; the driver board 8 and the power circuit board 5 are connected through a wire; the loudspeaker 6 is connected with the power circuit board 5 through a wire; the light source device 4 is connected with the radiator 2; a ventilating fan 3 is arranged beside the driver board 8, the power circuit board 5 and the loudspeaker 6; the front air outlet 13 is formed beside the radiator; a chip used for processing image signals is arranged on the driver board 8; a ballast is arranged on the power circuit board 5.

Furthermore, the light source device is provided with a reflection hopper 42; a light source lamp 41 fixedly connected with the radiator 2 is arranged in the reflection hopper 42; the optical conversion device 7 is provided with a Fresnel lens 71, a liquid crystal display screen 72, a collecting lens 73, a reflector 74 and a projection lamp 75 which are sequentially arranged on the emergent light path of the light source device, and a first projection lens 751 and a second projection lens 751 are arranged in the projection lamp 75; the projection lamp 75 is movably connected with the shell 1 and used for rotatably changing the focal distance between the first projection lens 751 and the second projection lens 752; the liquid crystal display screen 72 is connected with the driver board 8 and the power circuit board 5 through wires; on-off keys 15 and a multi-functional key 16 are arranged on the top surface of the detachable shell cover 17, and the on-off keys 15 and the multi-functional key 16 are correspondingly connected with buttons on the driver board 8 through actuating tappets; the collecting lens 72 can be rotatably adjusted through a collecting lens control knob 9 for light compensation, light is focused on a detected object, and thus the optimal illuminating effect is achieved; the light source lamp is an LED lamp, by using the LED lamp as the light source lamp, electricity can be saved, the luminous intensity is high, and the service life is long; a lamp cover 743 is arranged on the projection lamp 74, and dust can be prevented from accumulating on the projection lenses by covering the projection lamp 74 with the lamp cover 743 after projection; a dustproof sponge is arranged at the air outlets, so that dust is effectively filtered and prevented from entering the shell 1; the radiator 2 is made of metallic aluminum which has excellent heat dissipation performance; the height of the supporting feet 10 can be adjusted, and the position of a projected image can be adjusted up and down according to requirements so that the projected image can be watched by users conveniently.

First embodiment, the power interface is connected with an external power source, a power switch is turned on, the light source lamp is turned on by current through the power circuit board 5, and since the ballast is arranged on the power circuit board 5, output of the power source can be controlled, and accordingly the output power can be selectively set; afterwards, video equipment with the projection requirement is connected to the video input interface 12, image data is modulated through the chip on the driver board 8 and then transmitted to the liquid crystal display screen 72, so that a colored image is re-synthesized, white light emitted by the light source lamp 41 at the moment is projected onto the liquid crystal display screen 72 after being focused through the Fresnel lens 71, the image on the liquid crystal display screen 72 is amplified, and the image on the liquid crystal display screen 72 is finally projected onto an external screen after passing through the collecting lens 73, the reflector 74 and the projection lenses of the projection lamp 75; wherein, the collecting lens 73 can be rotatably adjusted according to requirements so as to change the light collecting capacity, the projection lamp 75 can rotate so that the focal distance between the first projection lens 751 and the second projection lens 752 can be adjusted, and accordingly the optimal projection effect is achieved; the loudspeaker 6 is connected with the power circuit board 5 and supplied with power by the power circuit board 6 and can play audio data in the image during use; the radiator 2 and the ventilating fan 3 discharge heat generated by the light source lamp 41, the power circuit board 5, the driver board 8 and the loudspeaker 6 through the front air outlet 13 and the rear air outlet 14, and thus the heat dissipation effect is achieved.

For those skilled in the field, various corresponding changes and transformations can be made according to the above technical scheme and concept, and all the changes and transformations should be within the protection scope of the claims of the utility model.

What is claimed is:

1. Projection display equipment, comprising a shell and a detachable shell cover, characterized in that a light source device, an optical conversion device, a driver board provided with a video input interface, a power circuit board provided with a power interface, and a loudspeaker are arranged in the shell, a front air outlet and a rear air outlet are formed in the side faces of the shell, and supporting feet are arranged at the lower end of the shell; the light source device is connected with the driver board and the power circuit board through wires; the driver board and the power circuit board are connected through a wire; the loudspeaker is connected with the power circuit board through a wire; the light source device is connected with a radiator; a ventilating fan is arranged beside a light source lamp circuit board, the power circuit board and the loudspeaker; the optical conversion device is provided with a Fresnel lens, a liquid crystal display screen, a collecting lens, a reflector and a projection lamp which are sequentially arranged on the emergent light path of the light source device, and a first projection lens and a second projection lens are arranged in the projection lamp; the liquid crystal display screen is connected with the driver board and the power circuit board through wires; the projection lamp is movably connected with the shell.

2. The projection display equipment according to claim 1, characterized in that the light source device is provided with a reflection hopper, and a light source lamp connected with the power circuit board is arranged in the reflection hopper.

3. The projection display equipment according to claim 1, characterized in that on-off keys and a multi-functional key are arranged on the top surface of the detachable shell cover.

4. The projection display equipment according to claim 3, characterized in that the on-off keys and the multi-functional key are correspondingly connected with buttons on the driver board through actuating tappets.

5. The projection display equipment according to claim 1, characterized in that the light source lamp is an LED lamp.

6. The projection display equipment according to claim 1, characterized in that the collecting lens can be rotatably adjusted.

7. The projection display equipment according to claim 1, characterized in that a lamp cover is arranged on the projection lamp.

8. The projection display equipment according to claim 1, characterized in that a dustproof sponge is arranged at the air outlets.

9. The projection display equipment according to claim 1, characterized in that the radiator is made of metallic aluminum.

10. The projection display equipment according to claim 1, characterized in that the height of the supporting feet can be adjusted.

* * * * *